H. D. SMITH.
TEA STRAINER.
APPLICATION FILED JAN. 14, 1909.
1,016,104.
Patented Jan. 30, 1912.
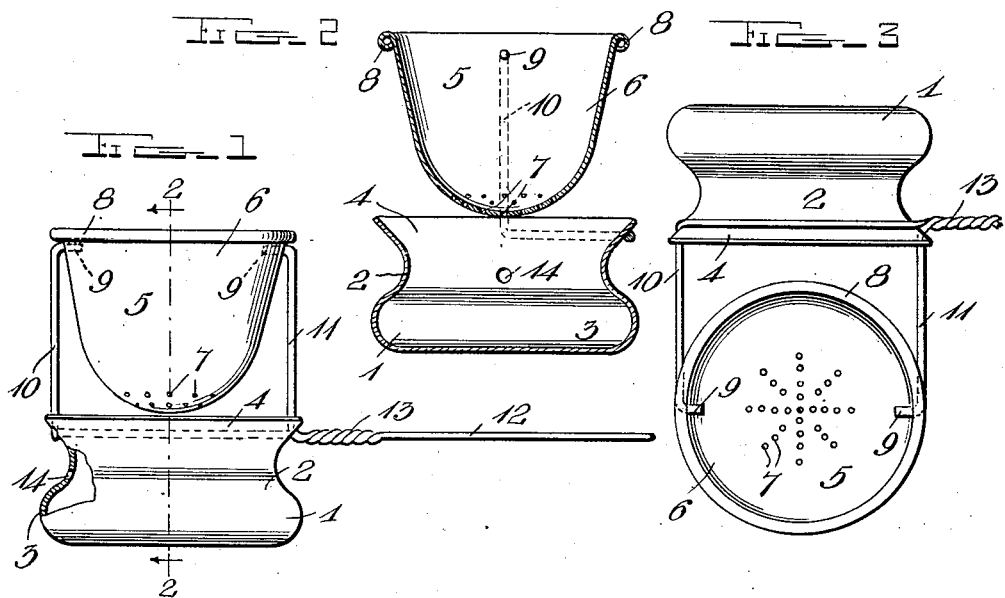
Witnesses
C. H. Giesbauer
Inventor
Henry D. Smith
by H. B. Willson & Co.
Attorneys

UNITED STATES PATENT OFFICE.

HENRY D. SMITH, OF MIDDLEBORO, MASSACHUSETTS.

TEA-STRAINER.

1,016,104.  Specification of Letters Patent.  Patented Jan. 30, 1912.

Application filed January 14, 1909. Serial No. 472,344.

*To all whom it may concern:*

Be it known that I, HENRY D. SMITH, a citizen of the United States, residing at Middleboro, in the county of Plymouth and State of Massachusetts, have invented certain new and useful Improvements in Tea-Strainers; and I do declare the following to be a full, clear, and exact description of the invention, such as will enable others skilled in the art to which it appertains to make and use the same.

My invention relates to tea strainers, and particularly to that type which are adapted for table use.

The object of the invention is to provide a strainer in combination with a drip cup which will effectively prevent any drippings from the strainer falling upon the table cloth.

Briefly stated, the invention primarily consists of a drip cup having an enlarged circular base portion with curved walls and a contracted neck located intermediate the top and bottom of the cup, the upper edge of the latter being flared upwardly and outwardly to form a funnel-shaped outlet for the cup, whereby a trap is formed, a handle for said cup and resilient upright supporting arms projecting above the cup, and a strainer movably secured between said arms.

With the above and other objects in view, the invention consists of certain novel features of construction, combination and arrangement of parts, as will be more fully described and particularly pointed out in the appended claim.

In the drawings, Figure 1 is a side elevation of one form of the device; Fig. 2 is a vertical central section thereof the plane being indicated by the line 2—2 in Fig. 1; Fig. 3 is a top plan view of the device shown in the position occupied when being used for straining purposes.

Referring more especially to the drawing, 1 represents a receptacle or cup which is provided in this instance with a contracted neck 2 connecting the base or trap portion 3 and the funnel-shaped mouth or head portion 4; the mouth or head portion is formed in the shape of a funnel in order to direct the drippings to the trap portion 3.

5 represents the strainer which is, in this instance, constructed of an integral piece of metal drawn into the form of a cup or bowl 6 having a plurality of perforations 7 formed in its bottom. The upper end of the bowl is spun over to form a reinforcing and limiting bead 8 whose purpose will be presently brought out. This cup is pivotally supported upon the trunnions 9 carried by the standards 10 and 11. The standards project vertically from the funnel-shaped mouth or head portion 4 of the receptacle 1, and are provided with the inwardly bent trunnions 9 which enter suitable apertures formed on diametrically opposite sides of the strainer 5 directly below the bead 8. The standards 10 and 11 pass through apertures in the upper edge of the portion 4 and form a continuation of the manipulating handle 12 which is shown in the form of a loop twisted at 13 at its inner end and having one end thereof extending directly through the aperture in the portion 4 to form the standard 11. The other end is extended around to the opposite side of the receptacle and passed through a similar aperture to form the standard 10. The overhanging or funnel-shaped mouth 4 conceals the end of the wire to which the standard 10 is connected so that the structure is not made unsightly. In this type an aperture 14 is shown through which the contents of the drip cup may be emptied.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention,—

In a straining device of the character described, a drip cup having an enlarged circular base portion with curved walls and a contracted neck located intermediate the top and bottom of the cup whereby a trap is formed at the lower portion of the cup, the upper edge of the cup being flared upwardly and outwardly to form an annular flange, the latter having at diametrically opposite points vertical openings, a strainer having at its top an upwardly projecting annular bead and having formed in its side walls at diametrically opposite points beneath said bead openings to receive pivots, a frame formed from a single piece of wire bent to provide a handle looped at one end of the frame, and a spirally twisted intermediate portion, one extremity of said wire being passed upwardly through one of the vertical openings on the flange of the drip cup to provide an upright resilient supporting arm and the other end of said wire being bent around one side of the drip cup beneath its flange and having its extremity projecting upwardly through the other openings in the flange of the drip cup to provide a second vertical resilient supporting arm, the upper extremities of the two arms being bent inwardly at right angles to form pivots which enter the pivot openings of the strainer whereby the latter is mounted to swing, the handle end of the frame being disposed in the plane of said upright arms, whereby when the drip cup is tilted to swing the strainer to operative position over a cup, the bead on the top of the strainer will engage said arms to limit the swinging movement of the strainer.

In testimony whereof I have hereunto set my hand in presence of two subscribing witnesses.

HENRY D. SMITH.

Witnesses:
 WM. R. FARRINGTON,
 GRACE E. BAILEY.

Copies of this patent may be obtained for five cents each, by addressing the "Commissioner of Patents, Washington, D. C."